(12) United States Patent
Kane

(10) Patent No.: US 7,558,198 B2
(45) Date of Patent: Jul. 7, 2009

(54) METHOD AND APPARATUS FOR DATA TRANSFER

(75) Inventor: John Richard Kane, Fox River Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 1411 days.

(21) Appl. No.: 10/223,417

(22) Filed: Aug. 19, 2002

(65) Prior Publication Data

US 2004/0032882 A1 Feb. 19, 2004

(51) Int. Cl.
H04L 12/26 (2006.01)
H04J 3/16 (2006.01)

(52) U.S. Cl. ........................................ 370/230; 370/468

(58) Field of Classification Search ................. 370/230, 370/338, 401, 477, 501, 395.41, 468
See application file for complete search history.

(56) References Cited

U.S. PATENT DOCUMENTS

| | | | | |
|---|---|---|---|---|
| 5,732,214 | A * | 3/1998 | Subrahmanyam | 709/227 |
| 5,892,754 | A * | 4/1999 | Kompella et al. | 370/236 |
| 6,085,221 | A * | 7/2000 | Graf | 709/202 |
| 6,292,827 | B1 * | 9/2001 | Raz | 709/217 |
| 6,304,651 | B1 * | 10/2001 | Cramer et al. | 379/221.01 |
| 6,314,108 | B1 * | 11/2001 | Ramasubramani et al. | 370/465 |
| 6,507,589 | B1 * | 1/2003 | Ramasubramani et al. | 370/465 |
| 6,563,517 | B1 * | 5/2003 | Bhagwat et al. | 715/735 |
| 6,587,735 | B1 * | 7/2003 | Yaguchi | 700/2 |
| 6,631,118 | B1 * | 10/2003 | Jones | 370/252 |
| 6,973,047 | B1 * | 12/2005 | Jones | 370/252 |
| 7,277,398 | B1 * | 10/2007 | Makipaa | 370/252 |
| 2002/0021669 | A1 * | 2/2002 | Kunito et al. | 370/235 |
| 2002/0046292 | A1 * | 4/2002 | Tennison et al. | 709/238 |
| 2002/0056010 | A1 * | 5/2002 | Lincoln et al. | 709/247 |
| 2002/0087674 | A1 * | 7/2002 | Guilford et al. | 709/223 |
| 2002/0101858 | A1 | 8/2002 | Stuart et al. | |
| 2002/0103620 | A1 * | 8/2002 | Hayashi et al. | 702/182 |
| 2003/0074443 | A1 * | 4/2003 | Melaku et al. | 709/224 |
| 2003/0117978 | A1 * | 6/2003 | Haddad | 370/331 |
| 2003/0193910 | A1 * | 10/2003 | Shoaib et al. | 370/331 |
| 2003/0208610 | A1 * | 11/2003 | Rochetti et al. | 709/230 |
| 2005/0080876 | A1 * | 4/2005 | Peiffer et al. | 709/217 |

FOREIGN PATENT DOCUMENTS

| | | |
|---|---|---|
| EP | 1 207 656 A2 | 5/2002 |
| WO | WO02/51100 A2 | 6/2002 |

* cited by examiner

Primary Examiner—Hong Cho

(57) ABSTRACT

A user will receive a variation of a particular file depending upon the type of network the user is currently accessing. More particularly, a user will typically receive a smaller version of a file when the user is accessing a low-bandwidth (low data rates) network, and can choose to receive a larger version of the file when the user accesses a high-bandwidth (high data rates) network. When several networks are available to the user either simultaneously or sequentially, the user will receive the optimum file version based on cost and quality preferences in the former case and may receive multiple versions of the file in the later case, each increasing in quality.

17 Claims, 3 Drawing Sheets

METHOD AND APPARATUS FOR DATA TRANSFER

FIELD OF THE INVENTION

The present invention relates generally to data transfer and in particular, to a method and apparatus for data transfer within a communication system.

BACKGROUND OF THE INVENTION

As the number of mobile devices has increased, so has the demand for data transfer utilizing these mobile devices. This has been highlighted by the emergence of data transfer protocols such as the wireless application protocol (WAP), the General Packet Radio System (GPRS), and other next generation cellular technologies that allow, for example, the access of remote files from a suitably equipped mobile telephone handset.

A problem associated with large scale data transfer over current cellular systems is that in many instances the user is not within the range of a high-speed network, and will have to transfer the file utilizing a more-commonly-available low-speed network. A further implication of this low data transfer rate is increased costs to users as most are billed by their service provider on a time or quantity of data basis. Clearly low data transfer rates will increase data acquisition times and therefore may increase the cost to the user.

An attempt to deal with the above-mentioned problem is described in European Patent EP 1207656A2, SYSTEM AND METHOD FOR DATA TRANSFER, by McDonnell et al. As described in the McDonnell patent, when a large file is to be transferred to a user, the user receives a "data is waiting" message. Upon receipt of the "data is waiting" message a user of the mobile device decides whether they wish to receive the data from the network via the low bandwidth connection, or wait until a high-bandwidth connection is available. If the user wishes to wait, nothing is sent to the user. When the user encounters a high-bandwidth connection, the user then requests the file to be transferred.

While the above procedure does ensure that no large file is transferred utilizing the low-speed network, shortcomings exist in that oftentimes a user does not know the contents of the file that is to be transferred to the user, and cannot make an adequate determination whether they want to receive the file. Additionally, in many instance the user would chose to download the file if an alternate, smaller size file was available. Therefore, a need exists for a method and apparatus for data transfer within a communication system that prevents large files from being transferred over low-speed links, yet better informs a user of the content of a large file to be transferred.

DETAILED DESCRIPTION OF THE DRAWINGS

Figure 1:
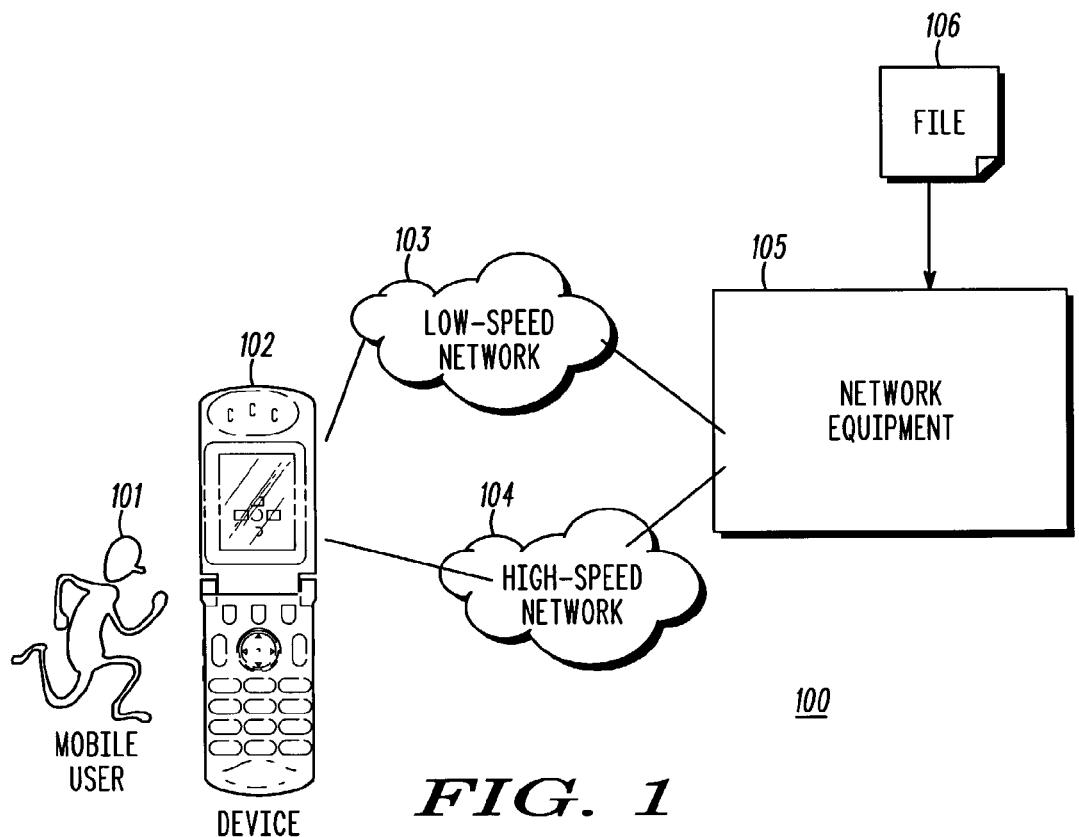
FIG. 1 is a block diagram of a communication system in accordance with the preferred embodiment of the present invention.

To address the above-mentioned needs, a method and apparatus for data transfer within a communication system is provided herein. In accordance with the preferred embodiment of the present invention, a user will receive a variation of a particular file depending upon the type of network the user is currently accessing. More particularly, a user will typically receive a smaller version of a file when the user is accessing a low-bandwidth (low data rate) network, and can choose to receive a larger version of the file when the user accesses a high-bandwidth (high data rate) network.

Because a smaller variation of the file is sent to the user when the user is utilizing a low-data rate connection, the user will know the contents of the file that can later be retrieved over the high-speed network. Additionally, in many instances the user may choose to simply choose to not retrieve the larger version of the file, thereby saving costs.

The present invention encompasses a method for over-the-air transmission of data. The method comprises the steps of receiving a file that is to be transmitted over-the-air to a user, and determining an over-the-air transmission rate for the user. Based on the over-the-air transmission rate for the user, the original file is either sent to the user, or a smaller version of the file is created and sent to the user.

The present invention additionally encompasses a method for transmitting data within a communication system. The method comprises the steps of receiving a file that is to be transmitted via over-the-air transmission to a user, determining a plurality of current over-the-air networks utilized by the user, and determining current download capabilities for the plurality of networks. The file is then compressed utilizing one of a plurality of compression schemes and the compressed file is transmitted to the user. In the preferred embodiment of the present invention the compressed file utilizes a compression scheme based on the current download capabilities for the networks utilized by the user.

The present invention additionally encompasses an apparatus comprising means for receiving a file that is to be transmitted over-the-air to a user, means for determining an over-the-air transmission rate for the user, and means for either sending the original file to the user, or creating a smaller version of the file and sending the smaller version of the file to the user, wherein the file sent to the user is based on the over-the-air transmission rate for the user.

The present invention additionally encompasses an apparatus for transmitting data within a communication system. The apparatus comprises means for receiving a file that is to be transmitted via over-the-air transmission to a user, means for determining a plurality of current networks utilized by the user, means for determining current download capabilities for the plurality of networks, means for compressing the file utilizing a compression scheme, and means for transmitting a compressed file to the user, wherein the compressed file utilizes a compression scheme based on the current download capabilities for the networks utilized by the user.

The present invention additionally encompasses an apparatus comprising a database capable of storing multiple compressed versions of a file, and logic circuitry coupled to the database, the logic circuitry configured to determine a current download capability and transmit a compressed version of the file, wherein the actual compressed version chosen for transmission is based on the current download capability.

Turning now to the drawings, wherein like numerals designate like components, FIG. 1 is a block diagram of communication system 100 in accordance with the preferred embodiment of the present invention. As shown, mobile user 101 utilizes mobile device 102 to access over-the-air networks 103 and 104. In the preferred embodiment of the present invention device 102 is preferably a mobile device such as a cellular phone or other portable communications device such as a personal digital assistant (PDA). Additionally, network 103 is preferably a low-speed network, such as, but not limited to a cellular telecommunications system such as GSM, GPRS, CDMA, . . . , etc., while network 104 is preferably a high-speed network such as but not limited to an 802.11 network, a Wide-Band CDMA network, a Bluetooth ad-hoc network, or any $3^{rd}$ Generation Cellular network.

Operation of communication system 100 in accordance with the preferred embodiment of the present invention occurs as follows. File 106 to be transferred to device 102 enters network equipment 105. For purposes of this example, file 106 comprises a large file (e.g., greater than 1 Megabyte) such as a picture file (JPEG, GIF, TIF, . . . , etc.) or a video clip (MPEG, H.263, AVI, . . . , etc.). Network equipment 105 determines over-the-air data transmission rates (bytes per second) to device 102, and based on the over-the-air transmission rates, either sends the original file to device 102, or creates a smaller (compressed) version of the file and sends the smaller version of the file to device 102. For example, if device 102 is currently accessing through low-speed network 103, then network equipment 105 will pass a smaller version of the file to device 102, giving user 101 an option to retrieve the original version upon accessing high-speed network 104.

It should be noted that in the preferred embodiment of the present invention network equipment 105 contains means for file compression that utilizes a plurality of standard file compression techniques to reduce the size of file 106. For example, if file 106 comprises a standard Joint Photographic Experts Group (JPEG) image, network equipment will utilize a number of standard JPEG compression techniques to reduce the file size of file 106. As one of ordinary skill in the art will recognize, the quality of the smaller file will suffer as a result, however, in return the user will know the contents of the file that can later be retrieved over the high-speed network. Additionally, in many instances the user may be satisfied with the compressed image and choose to simply not retrieve the larger version of the file, thereby saving costs.

Figure 2:
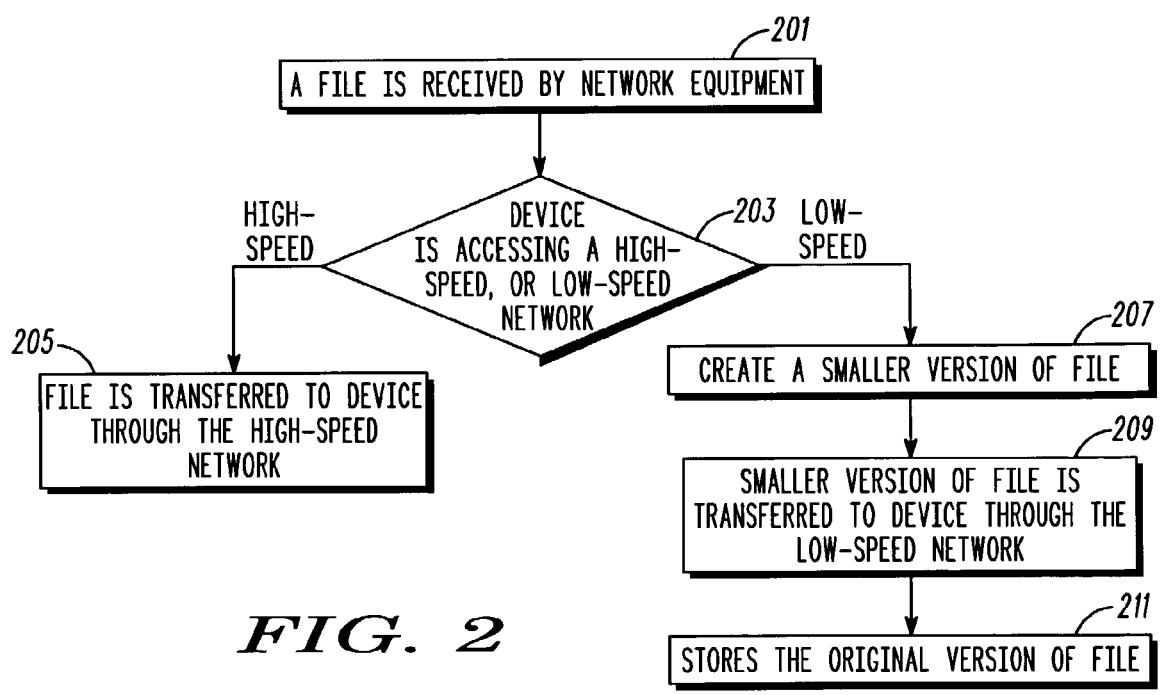
FIG. 2 is a flow chart showing operation of the communication system of FIG. 1 in accordance with the preferred embodiment of the present invention.

FIG. 2 is a flow chart showing operation of network equipment 105 in accordance with the preferred embodiment of the present invention. The logic flow begins at step 201 where file 106 is received by network equipment 105. As discussed above, file 106 comprises a large file that is to be transmitted over-the-air to device 102. In response, network equipment 105 determines if device 102 is accessing a high-speed, or low-speed over-the-air network (step 203). If, at step 203 it is determined that device 102 is accessing through a high-speed network, then the logic flow continues to step 205 where the file is transferred to device 102 through the high-speed network. However, if at step 203 it is determined that device 102 is accessing through low-speed network 103, then the logic flow continues to step 207 where a smaller version of file 106 is created. The smaller version is transmitted to device 102 through the low-speed network (209). At step 211 network equipment stores the original version of file 106 to be provided to device 102 upon device 102 accessing high-speed network 104. If requested, upon device 102 accessing high-speed network 104, network equipment 105 will provide device 102 the original file through network 104.

In the preferred embodiment of the present invention described above, network 105 utilizes a smaller version of a larger file to transmit over low-speed network 103. As one of ordinary skill in the art will recognize, many networks may be available to device 102, each having their own associated bandwidth. Additionally, device 102 may be simultaneously communicating with, or within range of multiple of these networks. With this in mind, in an alternate embodiment of the present invention network equipment 102 uses multiple compression schemes to create multiple variations of file 106. Equipment 102 chooses a particular compression/network combination based on a set of predetermined rules, which may or may not be user defined. The operation of such a system is described below with reference to FIG. 3 and FIG. 4.

Figure 3:
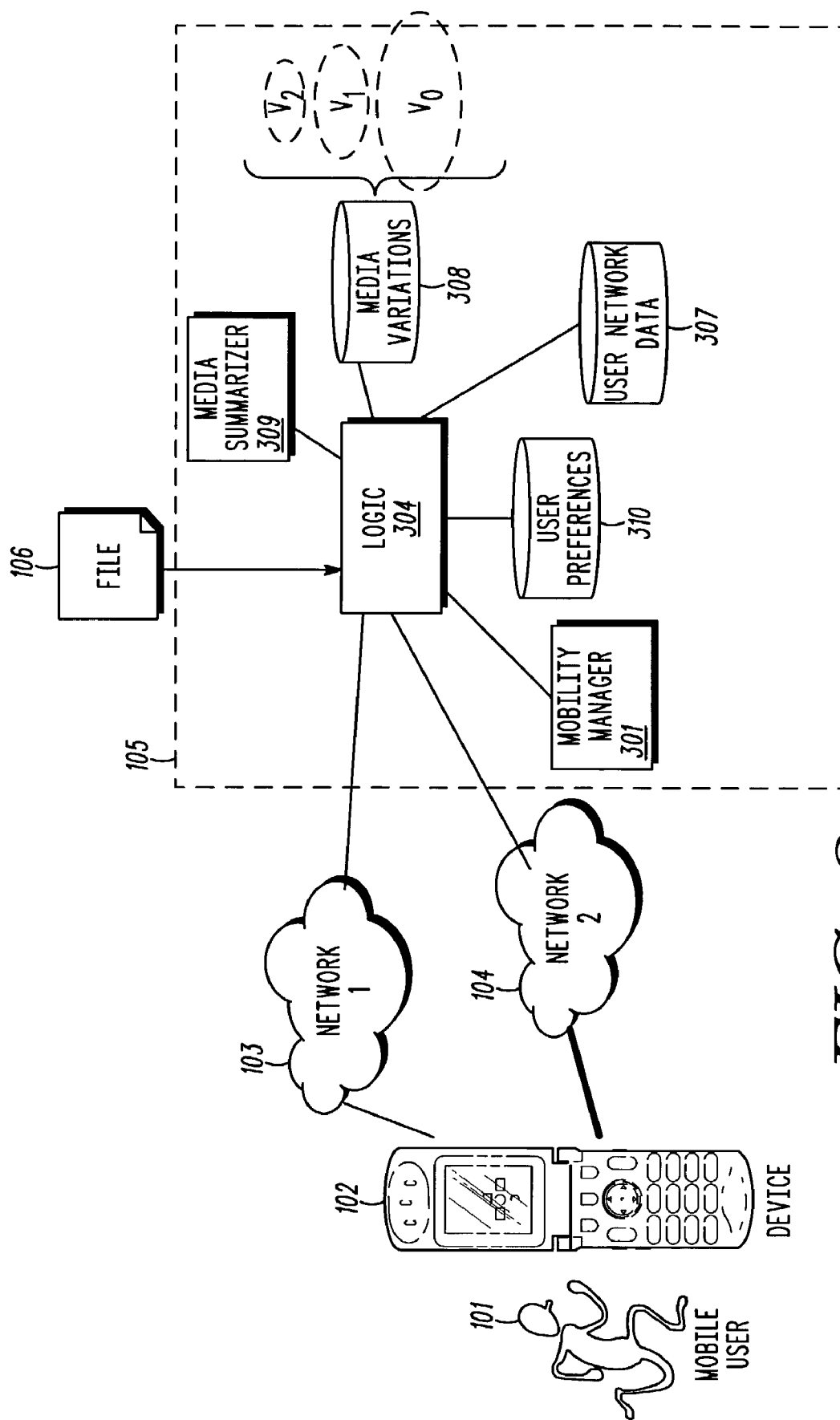
FIG. 3 is a more detailed block diagram of the communication system of FIG. 1 in accordance with the preferred embodiment of the present invention.

FIG. 3 is a more detailed block diagram of the communication system of FIG. 1. As shown, network 105 comprises logic circuitry 304, media summarizer 309, media variation database 308, user network database 307, user preference database 310, and mobility manager 301. In the preferred embodiment of the present invention media summarizer 309 comprises means for compressing files, and media variation database 308 comprises means for storing the compressed files. It is contemplated that elements within network 105 are configured in well known manners with processors, memories, instruction sets, and the like, which function in any suitable manner to perform the function set forth herein.

During operation, file 106 that is to be transmitted to device 102 enters logic circuitry 304. Logic circuitry 304 utilizes media summarizer 309 as means to create multiple variations of file 106. In particular, media summarizer 309, which comprises media analysis algorithms operating on a general purpose computer analyzes known compression techniques to create multiple compressed versions of file 106, each having its own compression scheme. These compressed versions differ in file size, from a largest (original version) to a smallest version, with the file quality degrading as the file size decreases. The differing compressed versions are stored in media variations database 308. Once the multiple files are obtained, logic circuitry accesses user network database 307 to determine the transmission capabilities and costs associated with all networks available to device 102. In particular, database 307 comprises a list of particular users, along with associated networks and network characteristics available to the users.

Logic unit 304 then accesses preferences database 310 to determine particular user preferences. In the alternate embodiment database 310 comprises means for storing file transfer preferences for each user that accesses the communication system. The user preferences may be predefined by either the user or the network, and may include such parameters as a maximum allowed time for a particular file to download, a maximum cost that a user will incur for downloading a file, . . . , etc. Utilizing the user preferences, logic unit 304 accesses mobility manager 301 to determine the particular network(s) the user is currently accessing, and based on the current network(s) download characteristics, logic unit 304 determines a version of the file to transmit to device 102. For example, if mobile user 101 has, as a preference, a maximum download time of 1 minute, logic unit 304 will utilize the current download data rate (determined from network database 307) and choose a file version/network combination that will result in a total download of no more than 1 minute.

A more complex approach to determining a file version to transmit to device 102 is to consider a cost associated with the transfer of a particular file over a particular network. The cost calculation function may be very straightforward or include other elaborations. For example, Let:
- $V_i$—$i^{th}$ element of the set of variations possible for the content, $\{V_1 \ldots V_Q\}$;
- $S(V_i)$—a size function for the $i^{th}$ variation, possibly size in bits;
- $N_j$—$j^{th}$ element of the set of possible transmission networks for this user and content, $\{N_1 \ldots N_P\}$;
- $C(N_j)$—the cost function for using network $N_j$, possibly a cost per bit transmitted; and
- $C\ ij$—the cost function defined as $C(N_j) \times S(V_i)$.

Hence a matrix of Q by P elements is created where each element is cost, C ij. Logic unit 304 will apply user preferences obtained from database 310 to:

1. Eliminate options of undesirable quality—e.g. where $S(V_i) < m$;
2. Eliminate options where $N_j$ is unavailable due to user mobility;
3. Eliminate options where costs are higher than a user established threshold—e.g., C ij>T;
4. Of the remaining entries select that element where the cost is lowest—in cases of ties select that element where $S(V_i)$ is highest;
5. Of the remaining entries select those elements where the $S(V_i)$ is highest, in case of ties select that element with the lowest cost; or
6. Select either element 4 or 5 based on user preference setting—optimize cost (4) or optimize quality (5).

In cases where the selection is less than optimal, that is $S(V_i) < T_{opt}$ (user preference parameter), then processing to post an event to resend is needed. If user approval is required for a resend, then a function button is packaged with the file to request subsequent delivery and a callback function attached to this button invokes retransmission processing. If user preferences allow automatic determination of suboptimal delivery, then logic unit 304 invokes retransmission processing directly. When the posted event conditions are satisfied, logic unit 304 sends the file associated with the event.

Figure 4:
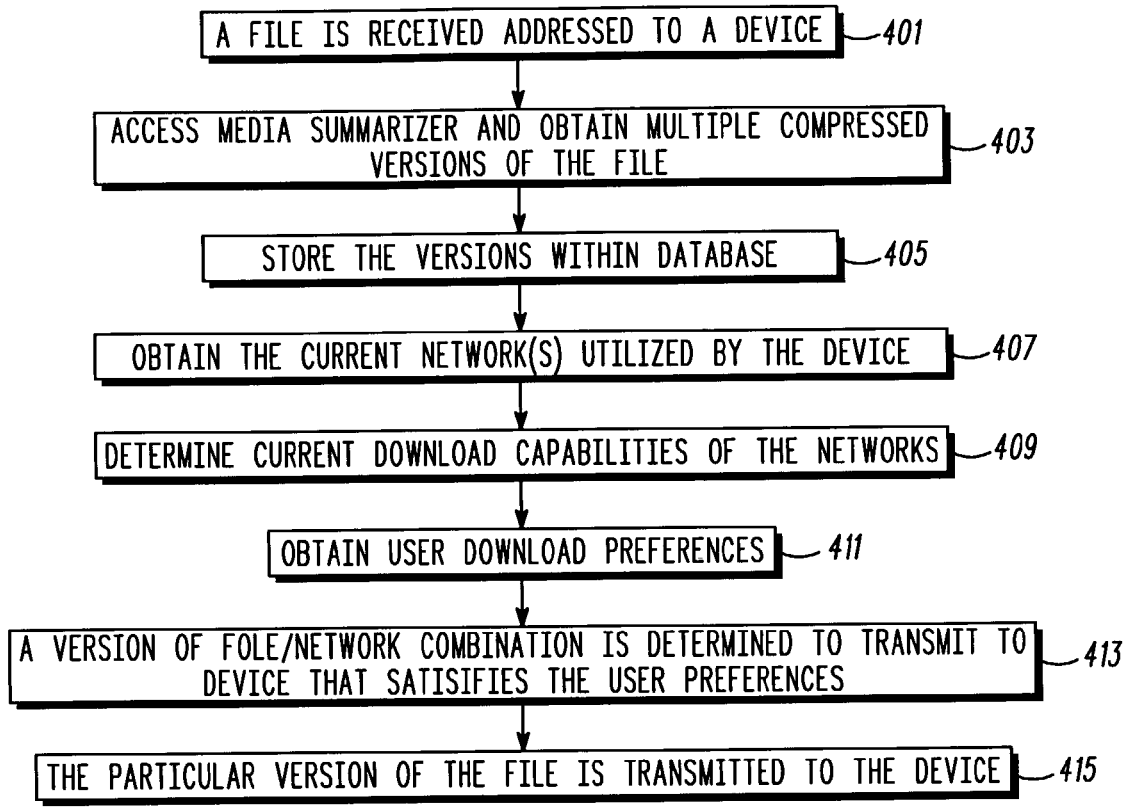
FIG. 4 is a flow chart showing operation of the communication system of FIG. 3 in accordance with the preferred embodiment of the present invention.

FIG. 4 is a flow chart showing operation of network equipment 105 of FIG. 3 in accordance with the preferred embodiment of the present invention. The logic flow begins at step 401 where file 106 is received by logic unit addressed to device 102. Logic unit 304 accesses media summarizer 309 and obtains multiple compressed versions of file 106 (step 403) and stores the versions within database 308 (step 405). Logic circuitry 304 then accesses mobility manager 301 to obtain the current network(s) utilized by device 102 (step 407). Based on the current networks being utilized by device 102, logic unit 304 accesses network database to determine a current download capabilities (bits per second) of the networks (step 409), and accesses user preference database 301 to obtain user download preferences (step 411). At step 413 a version of file 106/network combination is determined to transmit to device 102 that satisfies the user preferences. As discussed above, the version of file 106 chosen is based on the user preferences and the current download capabilities of the network being utilized by the device. The logic flow ends at step 415 where the particular version of file 106 is transmitted to device 102.

It should be noted that optionally, logic circuitry 304 may continue to store the versions of file 106 so that when device 102 accesses another network, a larger (and thus better quality) file may be transmitted to device 102. Therefore, because a smaller variation of the file is sent to the user when the user is utilizing a low-data rate connection, the user will know the contents of the file so that the file can later be retrieved over the high-speed network.

Figure 5:
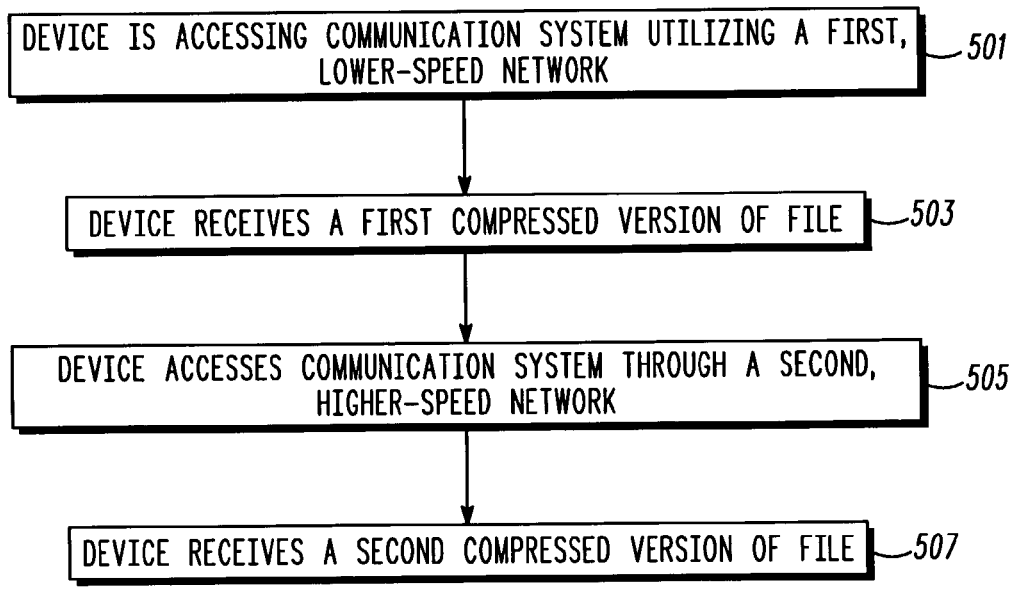
FIG. 5 is a flow chart showing operation of the remote unit of FIG. 1 in accordance with the preferred embodiment of the present invention.

FIG. 5 is a flow chart showing operation of device 102 of FIG. 1 in accordance with the preferred embodiment of the present invention. As discussed above, device 102 will retrieve a different version of file 106 depending upon the network being utilized by device 102. The logic flow begins at step 501 where device 102 is accessing communication system 100 utilizing a first, lower-speed network. At step 503, device 102 receives a first compressed version of file 106. At step 505 device 102 accesses communication system through a second, higher-speed network. Finally, at step 507, device 102 receives a second compressed version of file 106. As discussed above, the second compressed version may be a less-compressed version of file 106, or may simply be file 106 having no compression.

While the invention has been particularly shown and described with reference to a particular embodiment, it will be understood by those skilled in the art that various changes in form and details may be made therein without departing from the spirit and scope of the invention. For example, while the simplest way to compress a data file might be simply to compress from one standard scheme to another (e.g., PCM to MP3, MPEG2 to MPEG4, . . . , etc.) one of ordinary skill in the art will recognize that there are a number of other ways to summarize media into a set of variations. For instance, MPEG processing identifies key frames as important frames in a video. It is possible to collect these as JPEG images into a "photo album". An additional variation would be to select every $10^{th}$ image for inclusion or to select only the first. In the case of audio, it can be summarized by selecting a time segment such as the first 20 seconds, first 10 seconds, etc. In the case of text or speech (where speech is converted to text), summaries may be the first sentence of each paragraph, the first paragraph of the document, etc. Where metadata is bound to the media (for example, the title of the video or audio), this can be used as a summary variation as well. It is intended that such changes come within the scope of the following claims.

I claim:

1. A method for over-the-air transmission of data, the method comprising the steps of:
   - receiving a file that is to be transmitted over-the-air to a user;
   - determining an over-the-air transmission rate for the user;
   - creating a smaller version of the file;
   - sending the smaller version of the file to the user based on the over-the-air transmission rate for the user such that the smaller version of the file will be sent to the user when a lower over-the-air transmission rate is available to the user;
   - determining when the user has access to a communication system having a high over-the-air transmission rate; and
   - transmitting the original file to the user, only after the user has access to a communication system having a high over-the-air transmission rate.

2. The method of claim 1 wherein the step of creating the smaller version of the file comprises the step of creating a lower-quality version of the file.

3. The method of claim 1 wherein the step of transmitting the original file to the user after the smaller version of the file has been sent, comprises the step of transmitting the original file to the user only when the user has previously requested the file to be sent when the user has access to the high over-the-air transmission rate.

4. A method for transmitting data within a communication system, the method comprising the steps of:

receiving an original file that is to be transmitted via over-the-air transmission to a user;

determining a plurality of current over-the-air networks utilized by the user;

determining current download capabilities for the plurality of networks;

compressing the file utilizing one of a plurality of compression schemes;

transmitting the compressed file to the user, wherein the compressed file utilizes a compression scheme based on the current download capabilities for the networks utilized by the user such that the compressed version of the file will be sent to the user when a lower over-the-air transmission rate is available to the user;

determining when the user has access to a communication system having a higher over-the-air transmission rate; and transmitting the original file to the user, only after the user has access to a communication system having a high over-the-air transmission rate.

5. The method of claim 4 further comprising the step of:
determining user download preferences; and
the step of transmitting the compressed file to the user comprises the step of transmitting the compressed file to the user, wherein the compression scheme utilized in compressing the file is based on the current download capabilities for the networks utilized by the user and the user download preferences.

6. The method of claim 5 herein the step of determining user download preferences comprises the step of determining a maximum download time for the user.

7. The method of claim 5 wherein the step of determining user download preferences comprises the step of determining a maximum cost for transferring the file to the user.

8. The method of claim 4 wherein the step of determining current download capabilities comprises the step of determining how many bits per second can be transmitted to the user.

9. The method of claim 4 wherein the step of transmitting the compressed file to the user comprises the step of transmitting a lower-quality version of the file over a low-speed network and transmitting a higher-quality version of the file over a high-speed network.

10. The method of claim 4 wherein the step of transmitting the original file to the user after the smaller version of the file has been sent, comprises the step of transmitting the original file to the user only when the user has previously requested the file to be sent when the user has access to the high over-the-air transmission rate.

11. An apparatus for transmitting data within a communication system, the apparatus comprising:

means for receiving an original file that is to be transmitted via over-the-air transmission to a user;

means for determining a plurality of current networks utilized by the user;

means for determining current download capabilities for the plurality of networks;

means for compressing the file utilizing a compression scheme;

means for transmitting a compressed file to the user, wherein the compressed file utilizes a compression scheme based on the current download capabilities for the networks utilized by the user such that the smaller version of the file will be sent to the user when a lower over-the-air transmission rate is available to the user; and means for transmitting the original file to the user only after the user has access to a communication system having the high over-the-air transmission rate.

12. The apparatus of claim 11 further comprising:
means for determining user download preferences.

13. The apparatus of claim 12 herein the means for determining user download preferences comprises means for determining a maximum download time for the user.

14. The apparatus of claim 12 wherein the means for determining user download preferences comprises means for determining a maximum cost for transferring the file to the user.

15. The apparatus of claim 11 wherein the step of determining current download capabilities comprises the step of determining how many bits per second can be transmitted to the user.

16. The apparatus of claim 11 wherein the means for transmitting the compressed file to the user comprises means for transmitting a lower-quality version of the file over a low-speed network and transmitting a higher-quality version of the file over a high-speed network.

17. An apparatus comprising:
a database capable of storing an original file and multiple compressed versions of the file;

logic circuitry coupled to the database, the logic circuitry the logic circuitry determining that a low over-the-air transmission rate is available;

a network transmitting a smaller version of the file to the user;

the logic circuitry determining that a high over-the-air transmission rate is available; and a second network transmitting the original file to the user, only after the user has access to a communication system having a high over-the-air transmission rate.

* * * * *

UNITED STATES PATENT AND TRADEMARK OFFICE
CERTIFICATE OF CORRECTION

PATENT NO. : 7,558,198 B2  Page 1 of 1
APPLICATION NO. : 10/223417
DATED : July 7, 2009
INVENTOR(S) : Kane It is certified that error appears in the above-identified patent and that said Letters Patent is hereby corrected as shown below:

IN THE DRAWINGS

In Fig. 4, Sheet 3 of 3, for Tag "413", Line 1, delete "FOLE" and insert -- FILE --, therefor.
(ORIGINALLY FILED SPECIFICATION, IN THE DRAWINGS DATED AUGUST 19, 2002, SHEET 3/3, FIGURE 4, TAG "413", LINE 1)

In Fig. 4, Sheet 3 of 3, for Tag "413", Line 2, delete "SATISIFIES" and insert -- SATISFIES --, therefor.
(ORIGINALLY FILED SPECIFICATION, IN THE DRAWINGS DATED AUGUST 19, 2002, SHEET 3/3, FIGURE 4, TAG "413", LINE 2)

IN THE CLAIMS

In Column 7, Line 29, in Claim 6, delete "herein" and insert -- wherein --, therefor.
(APPEAL BRIEF FILED DATED MARCH 4, 2009, PAGE 23, CLAIM 27, LINE 1)

In Column 8, Line 21, in Claim 13, delete "herein" and insert -- wherein --, therefor.
(APPEAL BRIEF FILED DATED MARCH 4, 2009, PAGE 26, CLAIM 35, LINE 1)

Column 8, Line 40, Claim 17, after "the database," delete "the logic circuitry".
(APPEAL BRIEF FILED DATED MARCH 4, 2009, PAGE 27, CLAIM 39, LINE 4)

Signed and Sealed this

Ninth Day of February, 2010

David J. Kappos
*Director of the United States Patent and Trademark Office*